(12) United States Patent
Takeda

(10) Patent No.: US 12,474,583 B2
(45) Date of Patent: Nov. 18, 2025

(54) VIRTUAL IMAGE DISPLAY APPARATUS

(71) Applicant: SEIKO EPSON CORPORATION, Tokyo (JP)

(72) Inventor: Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 490 days.

(21) Appl. No.: 17/976,113

(22) Filed: Oct. 28, 2022

(65) Prior Publication Data

US 2023/0139134 A1    May 4, 2023

(30) Foreign Application Priority Data

Oct. 29, 2021  (JP) .................................. 2021-177167

(51) Int. Cl.
  *G02B 27/01*    (2006.01)
(52) U.S. Cl.
  CPC .... *G02B 27/0172* (2013.01); *G02B 2027/011* (2013.01); *G02B 2027/013* (2013.01); *G02B 2027/0178* (2013.01)
(58) Field of Classification Search
  CPC .......... G02B 27/0172; G02B 2027/011; G02B 2027/013; G02B 2027/0178; G02B 27/01; G02B 27/02
  See application file for complete search history.

(56) References Cited

U.S. PATENT DOCUMENTS

| | | | | |
|---|---|---|---|---|
| 6,046,857 | A * | 4/2000 | Morishima | G02B 27/0172 359/728 |
| 7,352,521 | B2 * | 4/2008 | Matsunaga | G02B 13/06 359/857 |
| 7,733,572 | B1 * | 6/2010 | Brown | G02B 17/0856 359/630 |
| 10,520,742 | B1 * | 12/2019 | Sulai | G02B 27/0172 |
| 2018/0299670 | A1 * | 10/2018 | Takahashi | G02B 27/0172 |
| 2020/0033573 | A1 | 1/2020 | Takeda et al. | |
| 2020/0033606 | A1 | 1/2020 | Takeda et al. | |
| 2020/0033607 | A1 | 1/2020 | Takeda et al. | |

FOREIGN PATENT DOCUMENTS

| | | |
|---|---|---|
| JP | H05-323229 A | 12/1993 |
| JP | 2014-048498 A | 3/2014 |
| JP | 2020-020857 A | 2/2020 |
| JP | 2020-020858 A | 2/2020 |
| JP | 2020-020859 A | 2/2020 |

* cited by examiner

*Primary Examiner* — Collin X Beatty
(74) *Attorney, Agent, or Firm* — Oliff PLC

(57) ABSTRACT

Provided is a virtual image display apparatus including a display device configured to emit an imaging light; a first mirror configured to reflect the imaging light from the display device; a refractive reflective optical member including a mirror portion configured to reflect the imaging light reflected by the first mirror; and a second mirror configured to reflect the imaging light reflected by the mirror portion toward a position of an exit pupil, wherein a distance from the display device to the first mirror is shorter than a distance from the position of the exit pupil to the second mirror; and a first angle $\theta$ formed by the imaging light incident on the second mirror and the imaging light reflected by the second mirror is greater than 0° and 45° or less.

7 Claims, 13 Drawing Sheets

VIRTUAL IMAGE DISPLAY APPARATUS

The present application is based on, and claims priority from JP Application Serial Number 2021-177167, filed Oct. 29, 2021, the disclosure of which is hereby incorporated by reference herein in its entirety.

BACKGROUND

1. Technical Field

The present disclosure relates to a virtual image display apparatus that guides imaging light to a pupil of a user by an optical system including a mirror formed by an imaging light generating unit or the like to enable observation of a virtual image.

2. Related Art

A known virtual image display apparatus that is applicable to a head-mounted display (HMD) includes three reflection surfaces and guides imaging light to a pupil of a user (JP-A-2020-20857).

However, in the eccentric optical system as described in JP-A-2020-20857, it is not easy to remove all distortion including trapezoidal distortion, and the occurring distortion needs to be electrically corrected, for example. However, this increases the circuit size and the power consumption. That is, a large load may be applied to the correction circuit side.

SUMMARY

A virtual image display apparatus according to an aspect of the present disclosure includes an imaging light emitting unit that emits an imaging light, a first mirror that reflects the imaging light from the imaging light emitting unit, an optical member that includes a reflecting portion reflecting the imaging light reflected by the first mirror, and a second mirror that reflects the imaging light reflected by the reflecting portion toward a position of an exit pupil, wherein a distance from the imaging light emitting unit to the first mirror is shorter than a distance from the position of the exit pupil to the second mirror, and a first angle between by the imaging light incident on the second mirror and the imaging light reflected by the second mirror is greater than 0° and 45° or less.

DESCRIPTION OF EXEMPLARY EMBODIMENTS

First Embodiment

Next, a virtual image display apparatus according to the first embodiment of the present disclosure will be described with reference to drawings.

Figure 1:
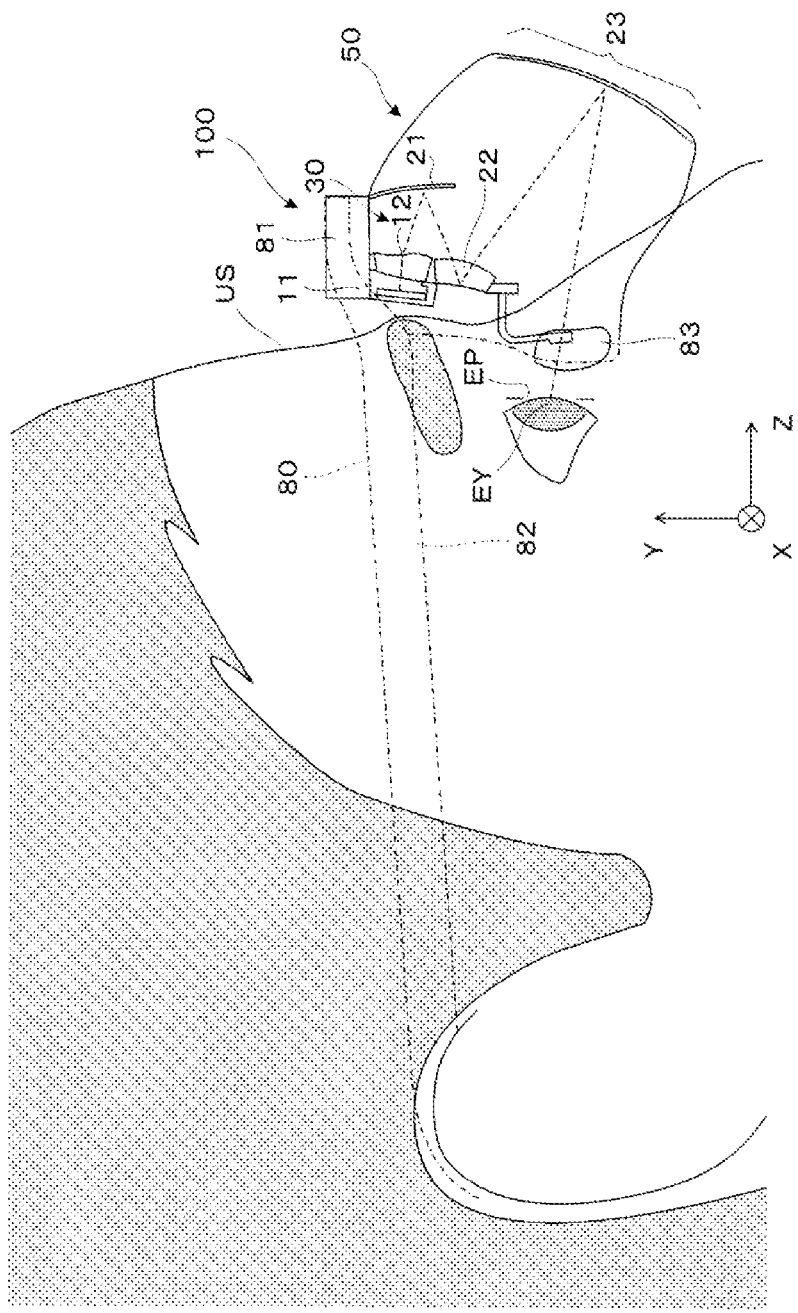
FIG. 1 is a side cross-sectional view illustrating a virtual image display apparatus according to a first embodiment.
Figure 2:
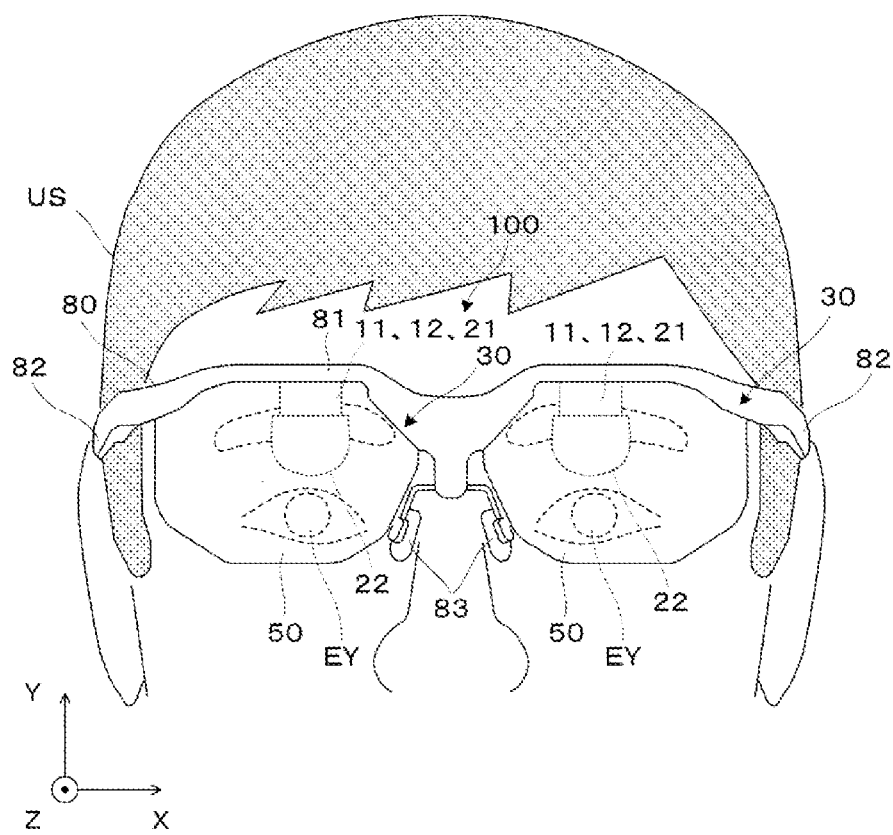
FIG. 2 is a front view for describing the virtual image display apparatus.
Figure 3:
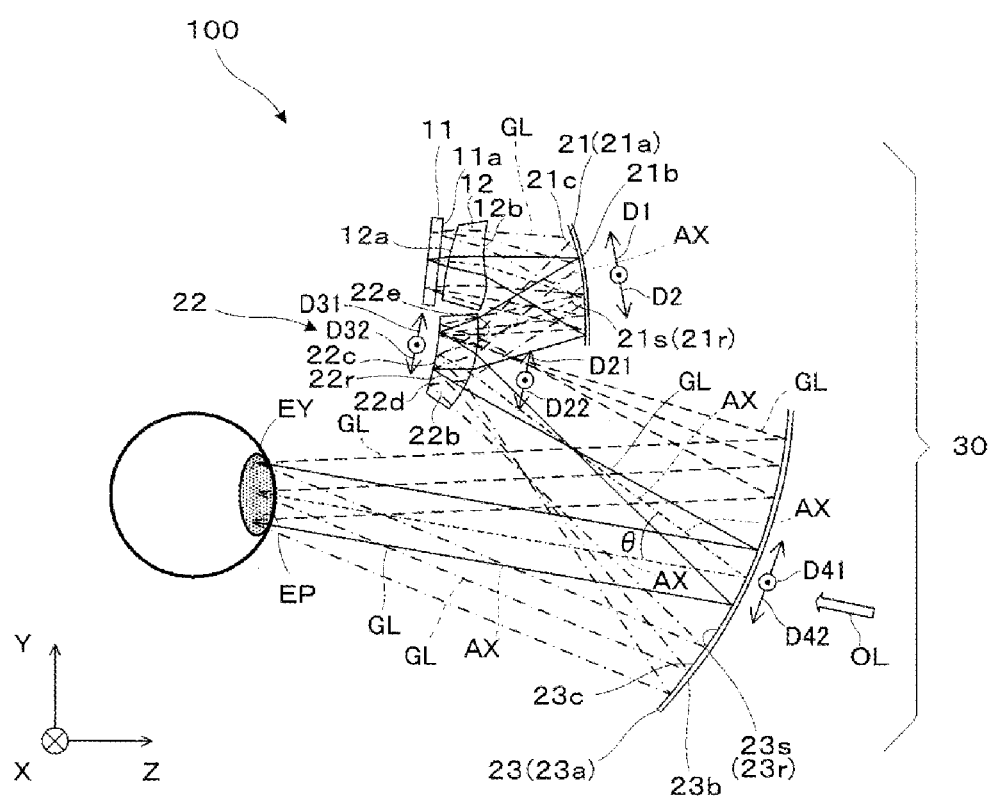
FIG. 3 is a side cross-sectional view for describing the optical structure and the like of the virtual image display apparatus.

In FIGS. 1 to 3, X, Y, and Z represent a Cartesian coordinate system. The X direction corresponds to the lateral direction in which the eyes of a user US wearing a virtual image display apparatus 100 are aligned. The Y direction corresponds to the upward direction orthogonal to the lateral direction in which the eyes of the user US are aligned and also corresponds to the vertical direction when the user US wears the virtual image display apparatus 100 at a predetermined position (normal wearing position). Also, the Z direction corresponds to the forward or front direction from the perspective of the user US and also corresponds to the horizontal direction when the user US wears the virtual image display apparatus 100 at a predetermined position (normal wearing position).

The illustrated virtual image display apparatus 100 is a head-mounted display and allows the user US to perceive images as virtual images. The virtual image display apparatus 100 includes a display device 11, which is an imaging light emitting unit, and a projection optical system 30. The projection optical system 30 includes a lens member 12, a first mirror 21, a refractive reflective optical member 22, and a second mirror 23. Here, the lens member 12 is a prismatic member (see FIG. 3) including aspheric refractive portion 12a and 12b, the first mirror 21 is a mirror member including a reflecting portion (mirror portion) 21r, and the second mirror 23 is a mirror member (see FIG. 3) including a reflecting portion (mirror portion) 23r. The refractive reflective optical member 22 is an optical member (see FIG. 3) including a refractive member 22b and a mirror portion (reflecting portion) 22r. The display device 11, the lens member 12, and the refractive reflective optical member 22 are fixed together, supported by a body member 81 of a frame 80. Further, as illustrated in FIGS. 1 and 2, the first mirror 21 and the second mirror 23 constitute an appearance member 50 and are supported by the body member 81 of the frame 80 on the upper portion and the side portion. The appearance member 50 is disposed in a state in which it is positioned more outward from or to the external side of the display device 11 and the refractive reflective optical member 22 relative to both. The appearance member 50 has an outline shaped like eyeglasses and has a convex outwardly curved shape covering the eyes of the user US. Note that in FIG. 1, only the virtual image display apparatus 100 for the right eye is illustrated, but, as illustrated in FIG. 2, the virtual image display apparatus 100 for the left eye has the same structure, and a virtual image display apparatus having an appearance like eyeglasses as a whole is formed by combining virtual image display apparatuses for both eyes. Note that regarding the virtual image display apparatus for both eyes, either the portion for the right eye or the left eye may be omitted to form a single-eye head-mounted display. In describing an overview of an optical path, imaging light GL emitted from the display device 11 passes through the lens member 12, is reflected by the first mirror 21, and is incident on the refractive reflective optical member 22. The imaging light GL incident on the refractive reflective optical member 22 is refracted and also reflected by the refractive reflective optical member 22 and emitted to the outside of the refractive reflective optical member 22. The imaging light GL emitted from the refractive reflective optical member 22 is reflected by the second mirror 23 of the transmissive type and incident on a position of an exit pupil EP.

The frame 80 has a structure similar to that of eyeglasses, and includes a sidepiece portion 82 connected to a lateral end portion of the body member 81, and a nose pad 83 at a tip of a metal fitting extending from the center of the body member 81.

With reference to FIG. 3, the display device 11 is an image forming unit and is disposed on the upper side or the +Y side of the projection optical system 30 corresponding to a head side of the user US. The display device (image forming unit) 11 is a self-luminous type display element typified by, for example, an organic electro-luminescence (organic EL), an inorganic EL, an LED array, an organic LED, a laser array, a quantum dot emission type element, and the like, and forms a still image or a moving image in color on a two-dimensional display unit 11a. The display device 11 is driven by a drive control circuit (not illustrated) and performs a display operation. When an organic EL display is used as the display device 11, the display device 11 is configured to includes an organic EL control unit. When a quantum dot display is used as the display device 11, the display device 11 is configured to emit green or red color by causing light of a blue light emitting diode (LED) to pass through a quantum dot film. The display device 11 is not limited to a self-luminous display element, and may be constituted by an LCD or the other light modulating element, and may form an image by illuminating the light modulating element with a light source such as a backlight. As the display device 11, a liquid crystal on silicon (LCOS, LCoS is a trade name), a digital micromirror device, and the like may be used instead of the LCD.

The projection optical system 30 is a non-coaxial optical system or an eccentric optical system on the assumption that oblique incidence is used. An eccentric direction of the projection optical system 30 is defined by the arrangement of the lens member 12, the first mirror 21, the refractive reflective optical member 22, and the like. Specifically, the lens member 12, the first mirror 21, the refractive reflective optical member 22, and the second mirror 23 have the eccentric direction set within a YZ plane. In other words, an optical axis AX passing through the lens member 12, the first mirror 21, the refractive reflective optical member 22, and the second mirror 23 is disposed along a plane that intersects the lateral direction in which a pair of pupils EY of the user US are aligned, i.e., the X direction, and extends in a substantially vertical direction and, more specifically, is disposed along the YZ plane that is orthogonal to the X direction and extends in the vertical direction. The optical axis AX is disposed along the vertical YZ plane, and thus an angle of view in the lateral direction is easily increased. When a plane including the optical axis AX is inclined in a clockwise direction or a counterclockwise direction (i.e., left or right) around the Z axis by a few 10°, an influence on the angle of view is not greatly increased with the optical axis AX extending in the substantially vertical direction. Further, the first mirror 21 is disposed on the upper side or the +Y side of the refractive reflective optical member 22 corresponding to the head side of the user US, and the refractive reflective optical member 22 is disposed on the upper side or the +Y side of the second mirror 23 corresponding to the head side of the user US. Herein, the upper side or the +Y side is considered with reference to an intersection or a point of contact between the lens member 12, the first mirror 21, the refractive reflective optical member 22, and the second mirror 23 and the optical axis AX.

The lens member 12 is a prismatic member that functions as a lens as described above and refracts and also transmits the imaging light GL from the first mirror 21. The lens member 12 includes a refractive portion (incident portion) 12a disposed on an incident side and a refractive portion (emitting portion) 12b disposed on an emission side. The refractive portions 12a and 12b are each a free curved surface, for example. The lens member 12 may be formed of, for example, a resin, but may also be formed of glass.

The first mirror 21 is a plate-like component that functions as a concave front surface mirror and reflects the imaging light GL passing through the lens member 12 from the display device 11. Regarding the structure of the first mirror 21, specifically, the first mirror 21 is a mirror plate 21a having a structure in which a reflection film 21c is provided on a front surface 21s of a plate-like body 21b. The reflecting portion 21r of the first mirror 21 is, for example, a free curved surface and has a shape corresponding to a front surface of the reflection film 21c or the front surface 21s of the plate-like body 21b. The reflecting portion 21r is not limited to a free curved surface and may be an aspheric surface. The reflecting portion 21r is asymmetric across the optical axis AX with respect to a first direction D1 corresponding to the eccentric direction in the YZ plane and is symmetric across the optical axis AX with respect to a second direction D2 or the X direction orthogonal to the first direction D1. The plate-like body 21b of the first mirror 21 is made of, for example, resin, but may also be made of glass. The reflection film 21c is formed of a single layer film or a multilayer film of metal such as Al and Ag, for example, but may also be a dielectric multilayer film. The reflection film 21c may be formed by lamination including a technique such as vapor deposition, but may also be formed by bonding a sheet-shaped reflective film.

In the first mirror 21 described above, an aberration reduction can be achieved by setting the reflecting portion 21r to be a free curved surface or an aspheric surface, and, particularly when a free curved surface is used, an aberration of the projection optical system 30, which is a non-coaxial optical system or an eccentric optical system, can be easily reduced. The free curved surface is a surface without an axis of rotational symmetry, and various polynomials may be used as a surface function of the free curved surface. In addition, the aspheric surface is a surface having an axis of rotational symmetry, but is a paraboloid or a surface other than a spherical surface expressed by a polynomial.

The refractive reflective optical member 22 is a prismatic member that functions as a lens and a mirror and refracts and also reflects the imaging light GL from the first mirror 21. The refractive reflective optical member 22 includes the refractive member 22b including a refractive portion 22e and a reflection film 22c provided at a non-refractive portion 22d of the refractive member 22b. The refractive member 22b of the refractive reflective optical member 22 is made of, for example, resin, but may also be made of glass. The refractive member 22b may be formed of a material having an Abbe number of greater than or equal to 50 in terms of suppressing occurrence of chromatic aberrations. The reflection film 22c is formed of a single layer film or a multilayer film of metal such as Al and Ag, for example, but may also be a dielectric multilayer film. The reflection film 22c may be formed by laminating, and may also be formed by affixing a sheet-shaped reflection film.

The refractive portion 22e of the refractive reflective optical member 22 is, for example, a free curved surface, but may also be an aspheric surface. The refractive portion 22e is a common incidence-emission surface through which the imaging light GL passes before and after reflection by the mirror portion 22r. In other words, a light beam from the first mirror 21 is refracted by the refractive portion 22e and incident into the refractive reflective optical member 22, and, when being reflected by the mirror portion 22r and emitted to the outside of the refractive reflective optical member 22, the light beam is refracted again by the refractive portion 22e. The refractive portion 22e is asymmetric across the optical axis AX with respect to a first direction D21 corresponding to the eccentric direction in the YZ plane, and is symmetric across the optical axis AX with respect to a second direction D22 or the X direction orthogonal to the first direction D21. In the refractive reflective optical member 22, the refractive portion 22e may be provided with an anti-reflective film.

The mirror portion 22r of the refractive reflective optical member 22 is, for example, a free curved surface and has a shape corresponding to an inner surface of the reflection film 22c or the non-refractive portion 22d of the refractive member 22b. The mirror portion 22r is not limited to a free curved surface and may be an aspheric surface. The mirror portion 22r is asymmetric across the optical axis AX with respect to a first direction D31 corresponding to the eccentric direction in the YZ plane and is symmetric across the optical axis AX with respect to a second direction D32 or the X direction orthogonal to the first direction D31.

The second mirror 23 is a plate-like component that functions as a concave front surface mirror and reflects the imaging light GL from the refractive reflective optical member 22. The second mirror 23 covers a position of the exit pupil EP in which the pupil EY is located and also has a concave shape toward the position of the exit pupil EP. The second mirror 23 is a mirror plate 23a having a structure in which a reflection film 23c is formed on a front surface 23s of a plate-like body 23b. The reflecting portion 23r of the second mirror 23 is, for example, a free curved surface and has a shape corresponding to a front surface of the reflection film 23c or the front surface 23s of the plate-like body 23b. The reflecting portion 23r is not limited to a free curved surface and may be an aspheric surface. The reflecting portion 23r is asymmetric across the optical axis AX with respect to a first direction D41 corresponding to the eccentric direction in the YZ plane and is symmetric across the optical axis AX with respect to a second direction D42 or the X direction orthogonal to the first direction D41.

The second mirror 23 is a transmissive type reflection element that transmits a portion of the imaging light GL upon reflection, and the reflection film 23c of the second mirror 23 has semi-transmissive properties. Accordingly, external light OL passes through the second mirror 23, and thus a see-through view of externals is enabled, and a virtual image can be superimposed on an external image. At this time, when the plate-shaped body 23b has a thickness of less than or equal to approximately a few millimeters, a change in magnification of the external image can be curbed to be small. A reflectance of the reflection film 23c with respect to the imaging light GL and the external light OL is set to 10% or greater and 50% or less in a range of an incident angle of the assumed imaging light GL from the viewpoint of ensuring a brightness of the imaging light GL and facilitating observation of the external image by see-through. The plate-like body 23b of the second mirror 23 is made of, for example, resin, but may also be made of glass. The reflection film 23c is formed of, for example, a dielectric multilayer film configured of a plurality of dielectric layers having a film thickness adjusted. The reflection film 23c may also be a single layer film or a multilayer film of metal such as Al and Ag having a film thickness adjusted. The reflection film 23c may be formed by laminating, and may also be formed by affixing a sheet-shaped reflection film.

A distance between the positions of the second mirror 23 and the exit pupil EP is set to a certain interval (approximately 14 mm) along the optical axis AX on the emission side or the Z axis, ensuring that there is space for placing eyeglasses. The second mirror 23 can be provided with an anti-reflective film on the plate-like body 23b on the opposite side to where the reflection film 23c is provided. In other words, an anti-reflective film can be provided on the external side of the second mirror 23.

As described above, an aberration reduction can be achieved by setting the refractive portion 12a and the refractive portion 12b of the lens member 12, the reflecting portion 21a of the first mirror 21, the refractive portion 22e of the refractive reflective optical member 22, the mirror portion 22r of the refractive reflective optical member 22, and the reflecting portion 23r of the second mirror 23 to be a free curved surface or an aspheric surface, and, particularly when a free curved surface is used, an aberration of the projection optical system 30 being a non-coaxial optical system or an eccentric optical system can be easily reduced.

In particular, in the present embodiment, the distance from the display unit 11a of the display device 11 to the reflecting portion 21r of the first mirror 21 is set to be shorter than the distance from the position of the exit pupil EP to the reflecting portion 23r of the second mirror 23, and a first angle θ formed by the imaging light GL incident on the reflecting portion 23r of the second mirror 23 and the imaging light GL reflected by the reflecting portion 23r of the second mirror 23 is set to greater than 0° and 45° or less. Thus, circuit correction prompted by the occurrence of a distortion such as trapezoidal distortion can be made unnecessary or the amount needed can greatly reduced. Note that, here, the angle formed by the imaging light GL incident on the second mirror 23 and the imaging light GL reflected by the second mirror 23 represents the angle forming by the imaging light GL that travels along the optical axis AX and is incident and reflected at the second mirror 23.

The optical path of the imaging light GL will be described below. First, the imaging light GL from the display device 11 passes through the lens member 12, is incident on the first mirror 21, and is reflected at a high reflectance close to 100% by the reflecting portion 21r. The imaging light GL reflected by the first mirror 21 is incident on the refractive reflective optical member 22, refracted by the refractive portion 22e, reflected at a high reflectance close to 100% by the mirror portion 22r, and refracted again by the refractive portion 22e. The imaging light GL from the refractive reflective optical member 22 is incident on the second mirror 23 and reflected at a reflectance of less than or equal to approximately 50% by the reflecting portion 23r. The imaging light GL reflected by the second mirror 23 is incident on the exit pupil EP where the pupil EY of the user US is. An intermediate image of the imaging light GL is formed between the refractive reflective optical member 22 and the second mirror 23. The intermediate image is formed by appropriately enlarging an image formed on the display unit 11a of the display device 11. The intermediate image does not intersect the refractive portion 22e to avoid the effects of unwanted matter and the like adhered to the refractive portion 22e. An angle of view observed in the position of the exit pupil EP is assumed to be about 50° diagonally, for example.

The first mirror 21 and the second mirror 23 described above are not limited to front surface mirrors and may be rear surface mirrors with the plate-like body 21b including the reflection film 21c on a rear surface and the plate-like body 23b including the reflection film 23c on a rear surface.

As described above, instead of the refractive reflective optical member 22, the first mirror 21 may be used as a refractive reflective optical member or the first mirror 21 and the refractive reflective optical member 22 may both be used as a refractive reflective optical member.

Figure 4:
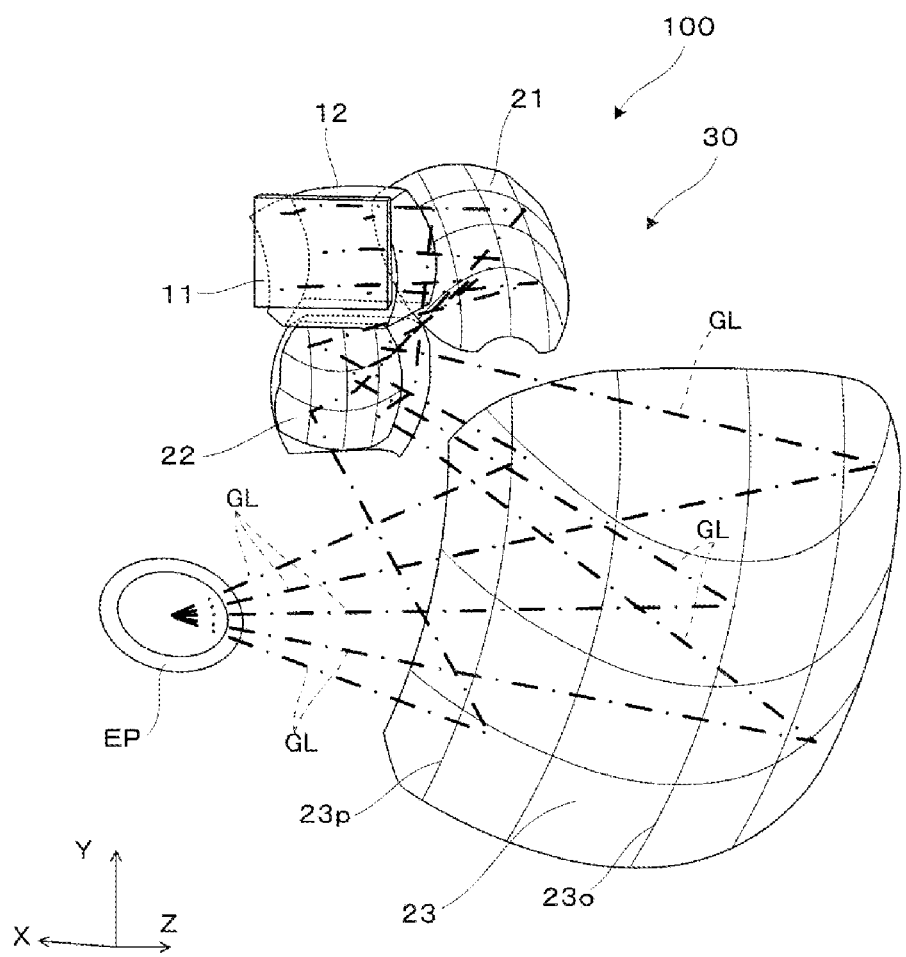
FIG. 4 is a perspective view for describing the optical structure and the like of the virtual image display apparatus.

Referring now to FIG. 4 and the like, the shape of the second mirror 23, in particular, of the projection optical system 30 constituting the virtual image display apparatus 100 will be described. Note that FIG. 4 is a perspective view illustrating an optical structure and the like of the virtual image display apparatus 100, FIG. 5 is a side cross-sectional view for describing the shape of the second mirror 23 of the virtual image display apparatus 100, and FIG. 6 is a plane cross-sectional view of the same.

As illustrated in FIG. 4 and as described above, the second mirror 23 has a concave shape toward the position of the exit pupil EP. Accordingly, regarding the area of the second mirror 23 on a curved line in the up-and-down direction (±Y direction), an area 23o on the curved line traveling along the center of the second mirror 23 and an area 23p traveling along an end side of the second mirror 23 are difference in terms of distance.

Figure 5:
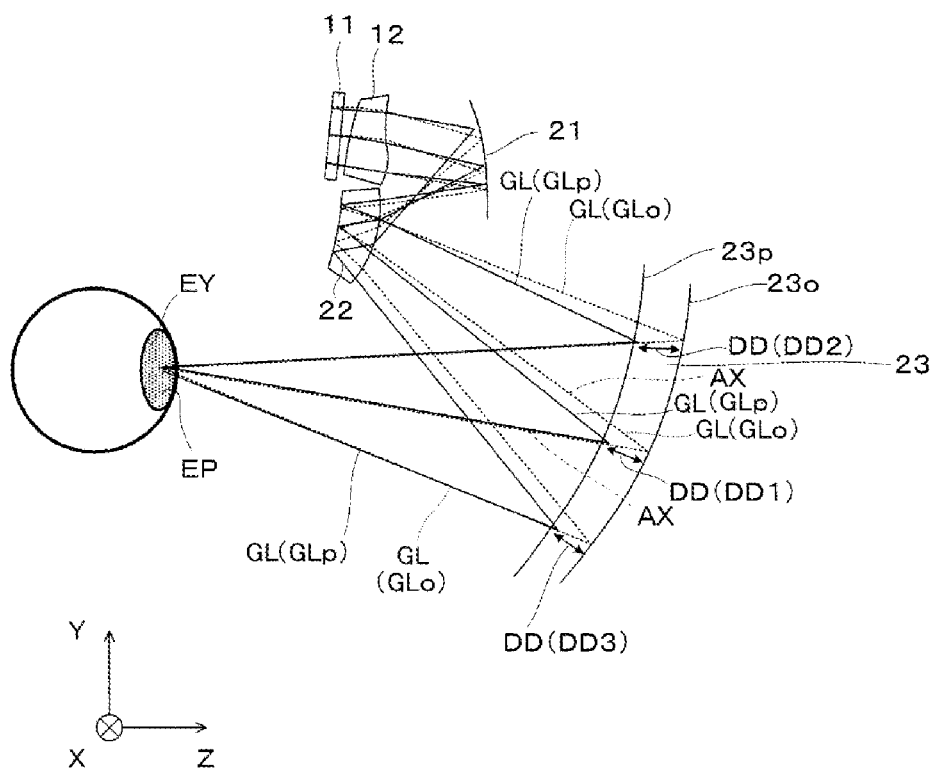
FIG. 5 is a side cross-sectional view for describing the shape of a second mirror of the virtual image display apparatus.
Figure 6:
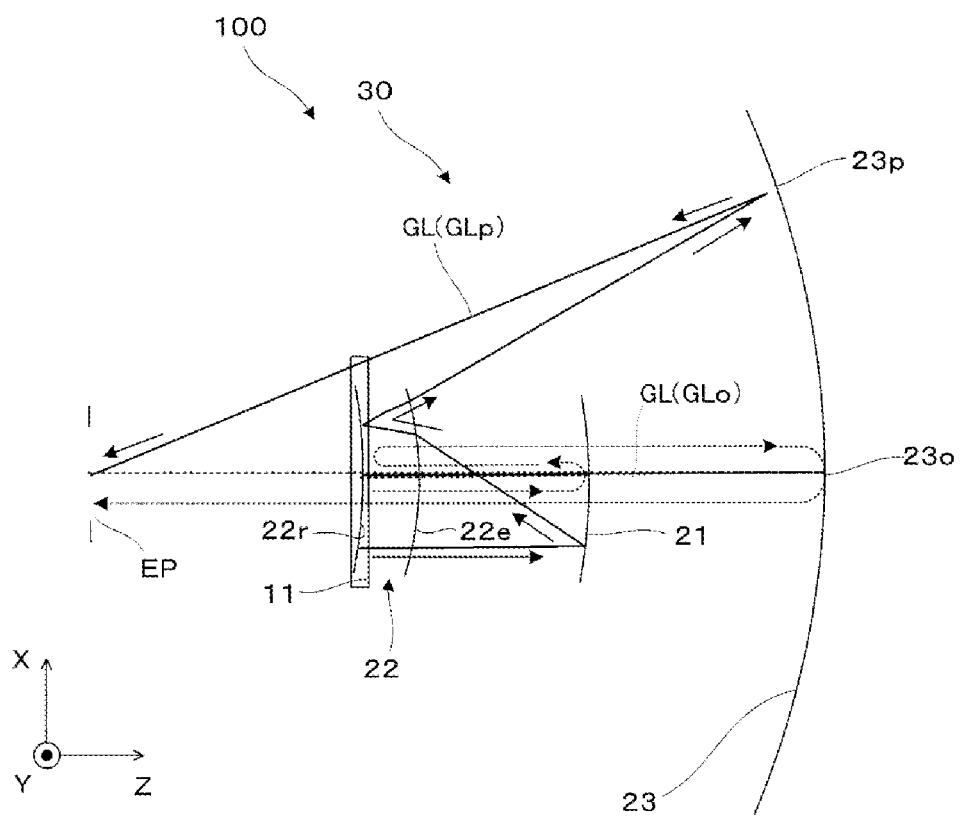
FIG. 6 is a plane cross-sectional view for describing the shape of a second mirror of the virtual image display apparatus.

For example, in FIG. 5, an imaging light GLo indicated by a dashed line is an imaging light reflected at or near the area 23o of the second mirror 23 toward the exit pupil EP. Also, an imaging light GLp indicated by a solid line is an imaging light reflected at or near the area 23p of the second mirror 23 toward the exit pupil EP. Note that the imaging light GLo and the imaging light GLp emitted from the same position (same height) in the ±Y direction from the display device 11 overlap in FIG. 5. However, as illustrated in FIG. 6, when viewed from above (+Y side), the imaging light GLo and the imaging light GLp emitted from the same height from the display device 11 do not overlap. That is, regarding the imaging light GLo and the imaging light GLp emitted from different positions in the X direction, as indicated by the arrows in FIG. 6 for example, the imaging light GLo is reflected at or near the area 23o of the second mirror 23 and the imaging light GLp is reflected at or near the area 23p of the second mirror 23. Returning to FIG. 5, even when the imaging light GLo and the imaging light GLp are emitted from the same height in the ±Y direction from the display device 11, a distance difference DD between reflection positions at the second mirror 23 is a difference of approximately 4 mm. In the example in FIG. 5, a distance difference DD1 between imaging light emitted from the height of a center position (reference position) of the display device 11, in other words, the imaging light GLo emitted along the optical axis AX and the imaging light GLp emitted from a peripheral side of the optical axis AX, is 4.0 mm. Also, a distance difference DD2 between the imaging light GLo and the imaging light GLp emitted from the display device 11 at a height (upper end) 3 mm separated in the upward direction (+Y direction) from the center position (reference position) is 4.2 mm. Also, a distance difference DD3 between the imaging light GLo and the imaging light GLp emitted from the display device 11 at a position (lower end) 3 mm separated in the downward direction (−Y direction) from the center position (reference position) is 3.5 mm. The second mirror 23 is curved in a manner to produce a difference as described above.

Next, an example of an arrangement relationship of the members constituting the optical system of the virtual image display apparatus 100 and a comparision method thereof will be described with reference to FIG. 7 and the like. Note that FIG. 8 is a conceptual diagram illustrating the arrangement of the members extracted from FIG. 7 illustrating the arrangement relationship of the members.

Figure 7:
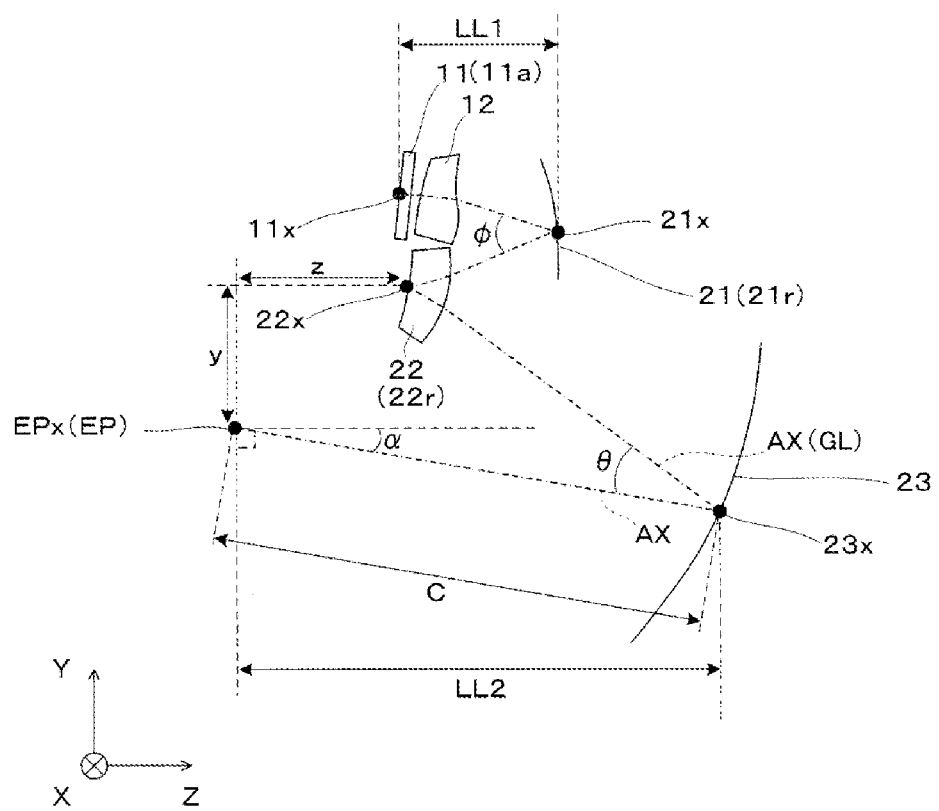
FIG. 7 is a side cross-sectional view for describing the arrangement relationship of the portions of the virtual image display apparatus.
Figure 8:
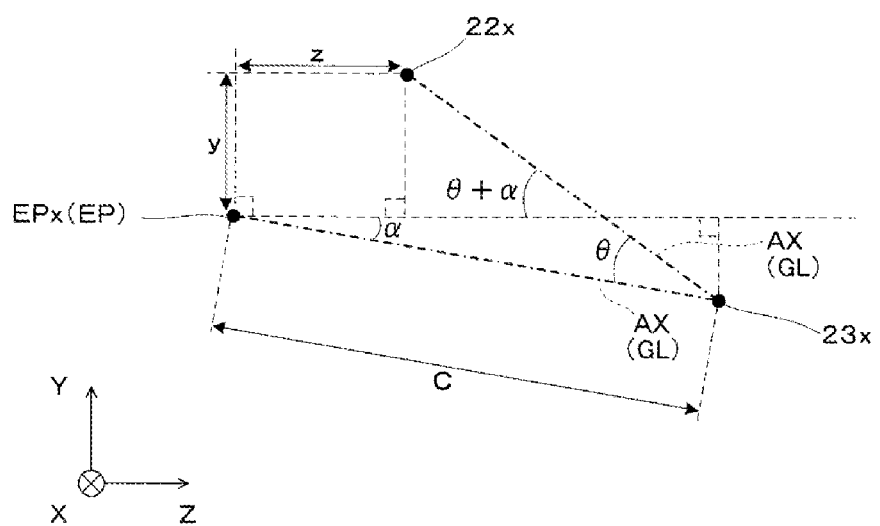
FIG. 8 is a conceptual diagram illustrating the arrangement of the members extracted from FIG. 7.

First, as illustrated in FIG. 7, herein, the arrangement relationship (positional relationship) of the members is defined using a position of each member where the optical axis AX passes through as the reference position. For example, in the case of the position of the exit pupil EP, a point EPx indicting a center position, which is the position where the optical axis AX meets the exit pupil EP, is the reference position. In a similar manner, the reference position of the second mirror 23 is a point 23x, the reference position of the refractive reflective optical member 22 (the mirror portion 22r) is a point 22x, the reference position of the first mirror 21 (reflecting portion 21r) is a point 21x, and the reference position of the display device 11 (display unit 11a) is a point 11x.

Also, the X direction, the Y direction, and the Z direction are used for directions. In this case, regarding the the X direction, the Y direction, and the Z direction, under the assumption that the virtual image display apparatus 100 is mounted in an ideal (virtual) state design-wise, the Z direction corresponds to forward or front direction from the perspective of the virtual user US, the X direction corresponds to the lateral direction (horizontal direction) in which both eyes are aligned, and the Y direction corresponds to the vertical direction.

Accordingly, as illustrated in FIG. 7 for example, the distance LL1 is shorter than the distance LL2, where, in the Z direction, the distance from the display device 11 to the first mirror 21 is defined as a distance LL1 and the distance from the position of the exit pupil EP to the second mirror 23 is defined as a distance LL2. It follows that the distance from the display device 11 to the first mirror 21 can be understood to be shorter than the distance from the position of the exit pupil EP to the second mirror 23.

Also, in the virtual image display apparatus 100, in an ideal state as described above, the direction of the optical axis AX from the second mirror 23 to the exit pupil EP is inclined slightly diagonally downward with respect to the Z direction as illustrated in FIGS. 7 and 8. From a perspective of ergonomics, a natural human line-of-sight angle is known to be approximately 10° downward, and also when visually perceiving an image (virtual image) from the virtual image display apparatus 100, shifting the center of the image 10° downward with respect to a reference corresponding to the Z direction may conceivably allow for a more nature and pleasant image viewing experience. Thus, in an ideal state as illustrated in the diagrams, the direction of the optical axis AX from the second mirror 23 to the exit pupil EP is configured to have a 10° downward incline in the up-and-down direction. In other words, in the diagrams, α=10°, where α is an inclination angle (line-of-sight inclination with respect to the Y direction) with respect to the Z direction of the optical axis AX toward the exit pupil EP.

Also, as illustrated in the diagrams, regarding the point EPx indicating the reference position of the exit pupil EP and the point 22x indicating the reference position of the refractive reflective optical member 22, of the distance from the point EPx to the point 22x, the distance in the Y direction (vertical direction) is defined as distance y and the distance in the Z direction (front-and-back direction) is defined as distance z.

Also, in this case, as described above, the angle formed by the imaging light GL incident on the second mirror 23 and the imaging light GL reflected by the second mirror 23 is treated as an angle representing the angle of the imaging light GL along the optical axis AX and is defined as the first angle θ. By increasing the first angle θ, it is expected that the portion of the virtual image display apparatus 100 overall positioned in front of the eyes can be kept from protruding out too far. However, when the degree of eccentricity with respect to the light guiding direction (−Y direction) of the imaging light GL increases, the occurring aberration also increases. In the case of the above-described mode, in particular, it is considered that the effects on light guiding in the vertical direction (Y direction) are greater and distortion aberration caused by a bias in the corresponding direction, in other words the vertical direction of the image, occurs more easily. Thus, from a perspective of aberration suppression, it is necessary to make the first angle θ small to some extent.

Furthermore, here, the distance along the optical axis AX from the position of the exit pupil EP (the point EPx) to the second mirror 23 (the point 23x) is defined as a distance C. That is, the distance C indicates the position of the second mirror 23 relative to the position of the eye of the user US, which is one of the indicators indicating the size in the front of the eyes relative to the virtual image display apparatus 100 overall.

Here, as can be seen from FIG. 8, the parameters, in other words the angle α, the distance y, the distance z, the distance C, and the first angle θ described above, of the optical axis AX from the point 22x indicating the reference position of the refractive reflective optical member 22 (the mirror portion 22r) to the point EPx are geometrically extracted and a relationship expressed by Formula (1) below is established.

$$C = \frac{y + z * \tan(\theta + \alpha)}{\cos(\alpha) * \tan(\theta + \alpha) - \sin(\alpha)} \quad (1)$$

C: The distance from the position of the exit pupil EP to the second mirror 23 y: The distance in the Y direction (vertical direction) from the position of the exit pupil EP to the position of the refractive reflective optical member 22 z: The distance in the Z direction (horizontal direction) from the position of the exit pupil EP to the position of the refractive reflective optical member 22

α: The inclination angle of the line-of-sight of the user US with respect to the Z direction (horizontal direction)

θ: The first angle formed by the imaging light GL incident on the second mirror 23 and the imaging light GL reflected by the second mirror 23

Here, the exit pupil EP is located at an eye position for the user US, the refractive reflective optical member 22 is located at a position closest to the forehead of the user US in the optical system. Thus, of those described above, the distance y and the distance z indicating the relative positional relationship between the exit pupil EP and the refractive reflective optical member 22 have numerical values in a relatively determined range, with typical examples expected to be y=14.5 mm and z=18.4 mm.

Also, of those described above, the inclination angle a of the line-of-sight is expected to be, in a typical example, α=10°.

From those above, when the distance y, the distance z, and the angle a are specified values, the Formula (1) described above indicates a relationship that should be satisfied by the first angle θ and the distance C from the position of the exit pupil EP and the second mirror 23. In this case, taking into consideration FIG. 8 and also the Formula (1) described above, the greater the distance C is, the smaller the first angle θ can be, and this allows the occurrence of aberrations in the optical system to be suppressed. However, the distance C indicates the position of the second mirror 23 with respect to the position of the eye of the user US, and thus the greater the distance C is, the more the overall size of the apparatus is increased.

In the present embodiment, by the first angle θ being greater than 0° and 45° or less, a configuration that suppresses aberration is achieved and, taking into consideration of the Formula (1) described above, the range of the distance C is kept to an appropriate range. This allows increases to the size of the apparatus to be suppressed.

Note that the value of the distance C is less than 100 mm, for example, and more preferably approximately from 70 mm to 80 mm or less from the perspective of the overall size of the apparatus and ensuring an angle that will ensure the reflecting region of the second mirror 23. Accordingly, it is expected that the lower limit value of the first angle θ is, for example, approximately 10°.

Referring back to FIG. 7, here in addition to those described above, an angle formed by the imaging light GL incident on the first mirror 21 and the imaging light GL reflected by the first mirror 21 is also defined as a second angle φ. The second angle φ, following from specify the first angle θ, is considered to be an angle representative of the second angle φ and is, for example, an angle of the components of the imaging light GL along the optical axis AX before and after the first mirror 21. Note that in the illustrated example, the first angle θ is smaller than the second angle φ.

Figure 9:
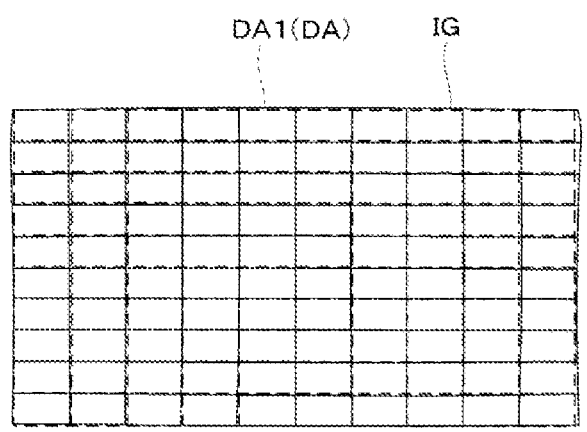
FIG. 9 is a conceptual diagram for describing a state of distortion aberration.

FIG. 9 is a conceptual diagram illustrating a state of an occurring aberration (distortion aberration). In the diagram, grid-like lines DA1 indicated by dashed lines correspond to the shape of a display image DA formed on the display unit 11a of the display device 11. In this case, the grid-like lines DA1 form a rectangular shape. On the other hand, grid-like lines IG indicated by solid lines indicate the shape of an image visually perceivably as a virtual image. In the diagram, the shapes are enlarged or reduced and superimposed to allow the shapes to be compared. In this case, it can be seen that there is some distortion but the shape basically retains a rectangular-shape, in other words there is basically no distortion aberration, and distortion in the vertical and horizontal directions in the optical system is removed. Here, for example, when a see-through image such as one formed by the virtual image display apparatus 100 is visually perceived, good visibility is considered to be maintained if the distortion is 5% or less and preferably from 2 to 3% compared to the original image without distortion. In the present embodiment, by setting the first angle θ to be greater than 0° and 45° or less, distortion occurring in the eccentric optical system can be sufficiently suppressed in the optical system, allowing for good image formation to be performed without requiring circuit correction or with keeping an increase in the burden due to circuit correction to a minimum.

Figure 10:
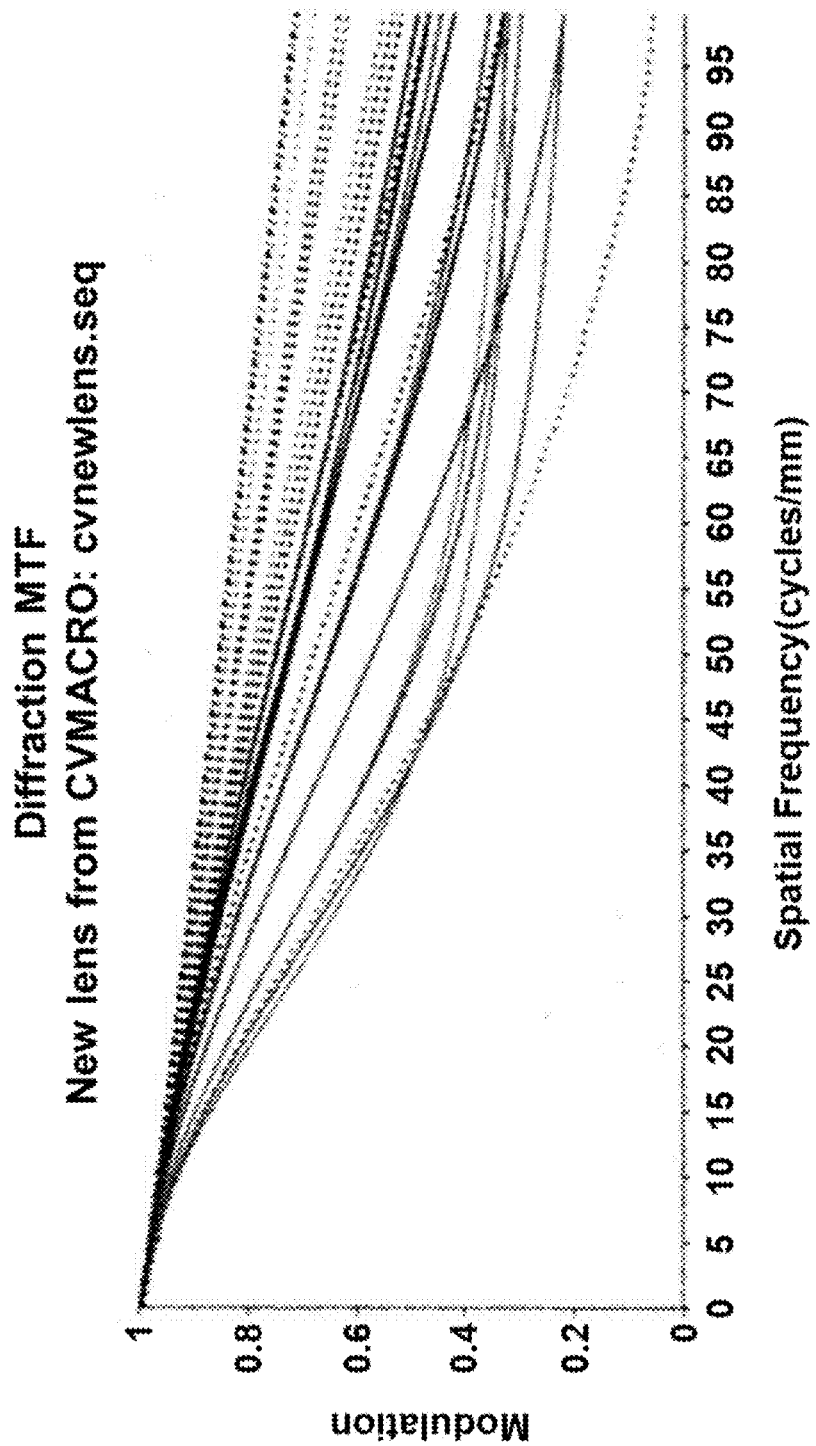
FIG. 10 is a graph showing resolution.

Note that FIG. 10 is a graph (MTF diagram) illustrating the resolution of the mode described above. It can be seen from FIG. 10 that image formation is formed in a sufficiently good state.

As described above, the virtual image display apparatus 100 includes the display device 11, which is an imaging light emitting unit configured to emit the imaging light GL; the first mirror 21 configured to reflect the imaging light GL from the display device 11; the refractive reflective optical member 22, which is an optical member including a the mirror portion 22r configured to reflect the imaging light GL reflected by the first mirror 21; and the second mirror 23 configured to reflect the imaging light GL reflected by the mirror portion 22r toward the position of the exit pupil EP, wherein the distance (the distance LL1) from the display device 11 to the first mirror 21 is shorter than the distance (the distance LL2) from the position of the exit pupil EP to the second mirror 23; and the first angle θ formed by the imaging light GL incident on the second mirror 23 and the imaging light GL reflected by the second mirror 23 is greater than 0° and 45° or less. In the virtual image display apparatus 100, the distance C from the position of the exit pupil EP to the position of the second mirror 23 is provided and the first angle θ formed by the imaging light GL incident on the second mirror 23 and the imaging light GL reflected by the second mirror 23 is greater than 0° and 45° or less. This allows the occurrence of distortion to be sufficiently suppressed, and allows for image formation with high accuracy to be performed without requiring electrical correction and the like by a correction circuit, for example.

Example 1

Hereinafter, Example 1, which is an implementation of the optical system of the virtual image display apparatus 100 according to the first embodiment, will now be described.

Table 1 below lists parameters for each surface constituting the virtual image display apparatus of Example 1. The unit of distance in the table is mm.

TABLE 1

| SURFACE NUMBER | SURFACE NAME | SURFACE TYPE | CURVATURE RADIUS | MATERIAL | REFRACTION/ REFLECTION |
|---|---|---|---|---|---|
| 1 | EXIT PUPIL EP | SPHERE | INFINITE | — | REFRACTION |
| 2 | SECOND MIRROR 23 | XY POLYNOMIAL SURFACE | −4.106 | | REFLECTION |
| 3 | INCIDENCE-EMISSION PORTION 22e OF REFRACTIVE REFLECTIVE OPTICAL MEMBER 22 | XY POLYNOMIAL SURFACE | −14.12 | RESIN A | REFRACTION |
| 4 | the mirror portion 22r OF REFRACTIVE REFLECTIVE OPTICAL MEMBER 22 | XY POLYNOMIAL SURFACE | −97.56 | RESIN A | REFLECTION |
| 5 | INCIDENCE-EMISSION PORTION 22e OF REFRACTIVE REFLECTIVE OPTICAL MEMBER 22 | XY POLYNOMIAL SURFACE | −14.12 | | REFRACTION |
| 6 | FIRST MIRROR 21 | XY POLYNOMIAL SURFACE | −22.01 | | REFLECTION |
| 7 | REFRACTIVE PORTION 12b | XY POLYNOMIAL SURFACE | −12.184 | RESIN B | REFRACTION |
| 8 | REFRACTIVE PORTION 12a | XY POLYNOMIAL SURFACE | −10.678 | | REFRACTION |
| 9 | COVER GLASS | SPHERE | INFINITE | SILICA | REFRACTION |
| 10 | DISPLAY UNIT 11a | SPHERE | INFINITE | | REFRACTION |

| SURFACE NUMBER | GLOBAL COORDINATES | | | |
|---|---|---|---|---|
| | x | y | z | α |
| 1 | | | | |
| 2 | 0 | 7.58 | 48.72 | 13.7 |
| 3 | 0 | 12.34 | 21.93 | 16.5 |
| 4 | 0 | 14.54 | 18.52 | 22.8 |
| 5 | 0 | 15.23 | 22.62 | 18.5 |
| 6 | 0 | 21.04 | 33.58 | 20 |
| 7 | 0 | 23 | 22.07 | 17.5 |
| 8 | 0 | 23.51 | 19.33 | 2.52 |
| 9 | 0 | 23.59 | 18.86 | 0 |
| 10 | 0 | 23.69 | 17.88 | 0 |

In this case, a light beam is followed from the exit pupil EP toward the display unit 11a. In table 1, the surface interval between adjacent surfaces, the material for the refractive medium, the surface distinction that is the refraction or reflection, and the global coordinates of each surface are described. Note that, for the material for the refractive medium, the resin A means a resin material having a refractive index of approximately 1.52 in a visible range and an Abbe number of 56.5, the resin B means a resin material having a refractive index of approximately 1.67 in a visible range and an Abbe number of 19.2, and SILICA means a quartz glass having a refractive index of approximately 1.47 in the visible range.

The data of Example 1 listed in Table 1 above shows that the free curved surface is represented by an xy polynomial surface, and the coefficient of the xy polynomial surface is given by the following Formula using z as the optical axis direction.

$$z = \frac{\varepsilon r^2}{1+\sqrt{1-(1+k)c^2r^2}} + \sum_{j=2}^{66} C_j x^m y^n \quad j = \frac{(m+n)^2 + m + 3n}{2} + 1$$

z: Sag amount of surface parallel with z axis
c: Vertex curvature
k: Conic coefficient
$C_j$: Coefficient of monomial $x^m y^n$
r: Distance in radius direction ($r=\sqrt{(x^2+y^2)}$)
Note that $C_j = C_j \times \{(\text{normalized radius})^{(m+n-1)}\}$.

Table 2 below is a table listing specific examples of the coefficient $C_i$.

TABLE 2

| Ci | | |
|---|---|---|
| C1 | k | CONIC CONSTANT |
| C2 | x | COEFFICIENT OF |
| C3 | y | COEFFICIENT OF |
| C4 | x2 | COEFFICIENT OF |

TABLE 2-continued

| Ci | | |
|---|---|---|
| C5 | xy | COEFFICIENT OF |
| C6 | y2 | COEFFICIENT OF |
| C7 | x3 | COEFFICIENT OF |
| C8 | x2y | COEFFICIENT OF |
| C9 | xy2 | COEFFICIENT OF |
| C10 | y3 | COEFFICIENT OF |
| C11 | x4 | COEFFICIENT OF |
| C12 | x3y | COEFFICIENT OF |
| C13 | x2y2 | COEFFICIENT OF |
| C14 | xy3 | COEFFICIENT OF |
| C15 | y4 | COEFFICIENT OF |
| C16 | x5 | COEFFICIENT OF |
| C17 | x4y | COEFFICIENT OF |
| C18 | x3y2 | COEFFICIENT OF |
| C19 | x2y3 | COEFFICIENT OF |
| C20 | xy4 | COEFFICIENT OF |
| C21 | y5 | COEFFICIENT OF |
| C22 | x6 | COEFFICIENT OF |
| C23 | x5y | COEFFICIENT OF |
| C24 | x4y2 | COEFFICIENT OF |
| C25 | x3y3 | COEFFICIENT OF |
| C26 | x2y4 | COEFFICIENT OF |
| C27 | xy5 | COEFFICIENT OF |
| C28 | y6 | COEFFICIENT OF |
| C29 | x7 | COEFFICIENT OF |
| C30 | x6y | COEFFICIENT OF |
| C31 | x5y2 | COEFFICIENT OF |
| C32 | x4y3 | COEFFICIENT OF |
| C33 | x3y4 | COEFFICIENT OF |
| C34 | x2y5 | COEFFICIENT OF |
| C35 | xy6 | COEFFICIENT OF |
| C36 | y7 | COEFFICIENT OF |
| C37 | x8 | COEFFICIENT OF |
| C38 | x7y | COEFFICIENT OF |
| C39 | x6y2 | COEFFICIENT OF |
| C40 | x5y3 | COEFFICIENT OF |
| C41 | x4y4 | COEFFICIENT OF |
| C42 | x3y5 | COEFFICIENT OF |
| C43 | x2y6 | COEFFICIENT OF |
| C44 | xy7 | COEFFICIENT OF |
| C45 | y8 | COEFFICIENT OF |

Table 3 below is a table providing a summary of the polynomial coefficients Ci that give a free curved surface included in Example 1.

TABLE 3

| | SURFACE NUMBER | | | | | | |
|---|---|---|---|---|---|---|---|
| | 2 | 3 | 4 | 5 | 6 | 7 | 8 |
| NORMALIZED RADIUS | 10 | 10 | 10 | 10 | 10 | 10 | 10 |
| C1 | −1 | 0 | 0 | 0 | 0 | 0 | 0 |
| C2 | 0 | 0 | 0 | 0 | 0 | 0 | 0 |
| C3 | −9.0291 | 0.3350 | −80.4496 | 0.3350 | 3.8993 | 2.5791 | 6.8181 |
| C4 | 9.8402 | −1.1805 | −22.8106 | −1.1806 | 2.6543 | −0.3600 | 0.5367 |
| C5 | 0 | 0 | 0 | 0 | 0 | 0 | 0 |
| C6 | 9.5401 | −1.2298 | 27.5978 | −1.2296 | 3.7110 | 4.9874 | 10.8911 |
| C7 | 0 | 0 | 0 | 0 | 0 | 0 | 0 |
| C8 | 0.0156 | 0.1271 | −76.4135 | 0.1271 | 2.9937 | −25.2712 | −39.8347 |
| C9 | 0 | 0 | 0 | 0 | 0 | 0 | 0 |
| C10 | 1.8219 | 0.6180 | 91.7462 | 0.6180 | 1.4769 | −5.3634 | −8.2641 |
| C11 | −1.6142 | 0.3100 | 9.0212 | 0.3100 | −4.5835 | −5.9867 | −17.9952 |
| C12 | 0 | 0 | 0 | 0 | 0 | 0 | 0 |
| C13 | 0.2187 | −0.5168 | −199.1072 | −0.5168 | 0.3421 | −42.3371 | −86.3267 |
| C14 | 0 | 0 | 0 | 0 | 0 | 0 | 0 |
| C15 | −0.1083 | 1.1462 | −97.0445 | 1.1462 | −0.1056 | −3.6247 | −25.1239 |
| C16 | 0 | 0 | 0 | 0 | 0 | 0 | 0 |
| C17 | 2.4123 | 1.9471 | 60.7310 | 1.9471 | −4.7776 | −8.8809 | −28.7075 |
| C18 | 0 | 0 | 0 | 0 | 0 | 0 | 0 |
| C19 | 0.3817 | 1.4052 | −494.7267 | 1.4052 | −0.0834 | −21.9315 | −36.2182 |
| C20 | 0 | 0 | 0 | 0 | 0 | 0 | 0 |

TABLE 3-continued

| | SURFACE NUMBER | | | | | | |
|---|---|---|---|---|---|---|---|
| | 2 | 3 | 4 | 5 | 6 | 7 | 8 |
| C21 | −0.0347 | 1.7105 | −343.5757 | 1.7105 | −0.1521 | −0.0598 | −18.8767 |
| C22 | −0.0709 | 0 | 23.0613 | 0 | 2.2831 | 0 | 0 |
| C23 | 0 | 0 | 0 | 0 | 0 | 0 | 0 |
| C24 | −1.2313 | 0 | 118.9659 | 0 | 1.0305 | 0 | 0 |
| C25 | 0 | 0 | 0 | 0 | 0 | 0 | 0 |
| C26 | −0.2629 | 0 | −777.6150 | 0 | 0.0443 | 0 | 0 |
| C27 | 0 | 0 | 0 | 0 | 0 | 0 | 0 |
| C28 | −0.0170 | 0 | −285.4844 | 0 | −0.0337 | 0 | 0 |
| C29 | 0 | 0 | 0 | 0 | 0 | 0 | 0 |
| C30 | 0.0425 | 0 | 58.3577 | 0 | 3.0839 | 0 | 0 |
| C31 | 0 | 0 | 0 | 0 | 0 | 0 | 0 |
| C32 | 0.2625 | 0 | 89.4878 | 0 | 2.2992 | 0 | 0 |
| C33 | 0 | 0 | 0 | 0 | 0 | 0 | 0 |
| C34 | 0.0567 | 0 | −601.9941 | 0 | −0.1774 | 0 | 0 |
| C35 | 0 | 0 | 0 | 0 | 0 | 0 | 0 |
| C36 | 0.0067 | 0 | −39.4808 | 0 | −0.0320 | 0 | 0 |
| C37 | −0.0003 | 0 | −0.2500 | 0 | 0.0082 | 0 | 0 |
| C38 | 0 | 0 | 0 | 0 | 0 | 0 | 0 |
| C39 | −0.0062 | 0 | 37.9565 | 0 | 1.0280 | 0 | 0 |
| C40 | 0 | 0 | 0 | 0 | 0 | 0 | 0 |
| C41 | −0.0202 | 0 | 20.5279 | 0 | 0.5523 | 0 | 0 |
| C42 | 0 | 0 | 0 | 0 | 0 | 0 | 0 |
| C43 | −0.0042 | 0 | −175.5070 | 0 | −0.0897 | 0 | 0 |
| C44 | 0 | 0 | 0 | 0 | 0 | 0 | 0 |
| C45 | −0.0006 | 0 | 20.0994 | 0 | −0.0105 | 0 | 0 |

Second Embodiment

Next, a virtual image display apparatus according to the second embodiment of the present disclosure will be described with reference to FIG. 11 and the like. Note that the virtual image display apparatus according the second embodiment is obtained by modifying a part of the virtual image display apparatus according to the first embodiment, and description of common portions will be omitted. Note that FIG. 11 is a diagram corresponding to FIG. 3, and FIG. 12 is a diagram corresponding to FIG. 9.

Figure 11:
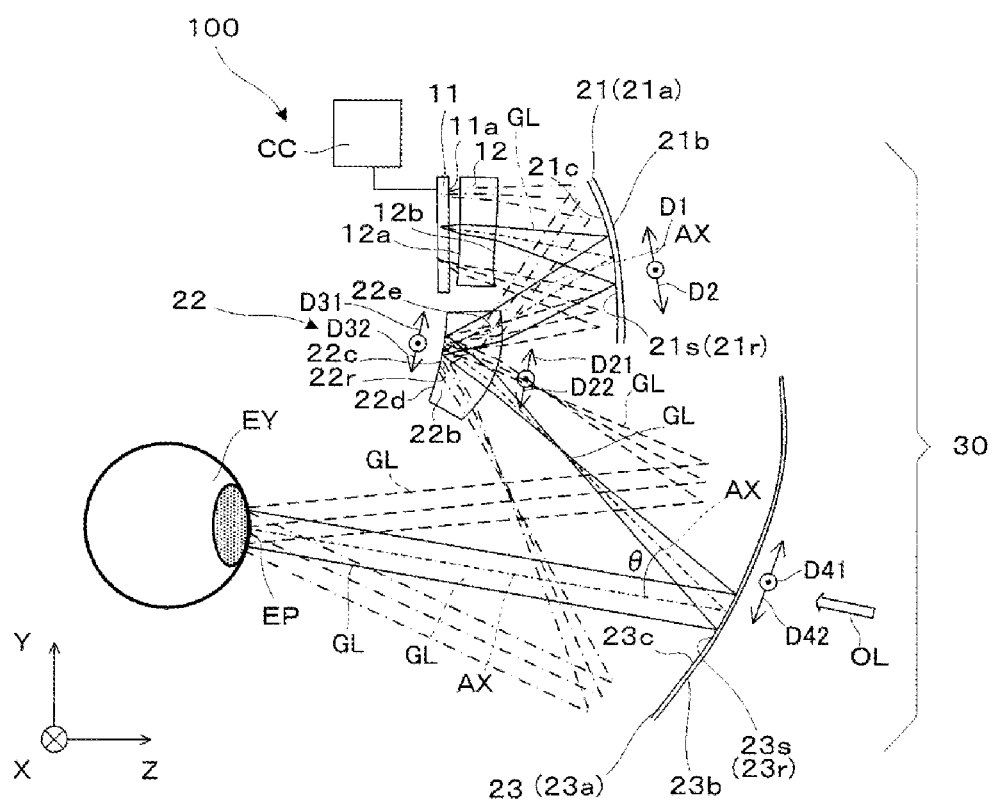
FIG. 11 is a side cross-sectional view for describing the optical structure and the like of a virtual image display apparatus according to a second embodiment.

As illustrated in FIG. 11, the virtual image display apparatus 100 of the second embodiment includes, as the projection optical system 30, the lens member 12, the first mirror 21, the refractive reflective optical member 22, and the second mirror 23 in a similar manner to the first embodiment and further includes a correction circuit CC in the display device 11. In the present embodiment, the occurrence of vertical distortion (distortion in the vertical direction of the image) is suppressed in the optical system and horizontal distortion (distortion in the horizontal direction of the image) is subjected to circuit correction by the correction circuit CC, making this mode different from the first embodiment, which suppressed aberrations including both vertical distortion and horizontal distortion. Note that as illustrated in the diagram, in the present embodiment also, the distance from the display device 11 to the first mirror 21 is shorter than the distance from the position of the exit pupil EP to the second mirror 23.

Figure 12:
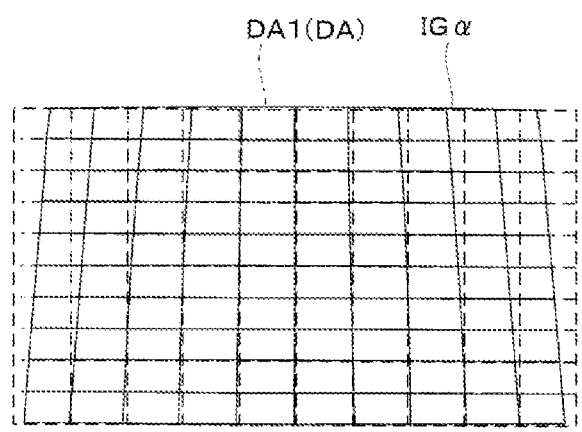
FIG. 12 is a diagram for describing a state of distortion aberration.

FIG. 12 is a conceptual diagram illustrating a state of an occurring aberration (distortion aberration) in the optical system when correction by the correction circuit CC is not performed, for example. In the diagram, in a similar manner to FIG. 9, the grid-like lines DA1 indicated by dashed lines correspond to the shape of the display image DA formed on the display unit 11a of the display device 11, and grid-like lines IGα indicated by solid lines indicated an image of when correction by the correction circuit CC is not performed. In other words, as is clear from the state illustrated in FIG. 12, in the case of the present embodiment, vertical distortion is removed from the optical system, but horizontal distortion remains. In this case, however, as can be seen from FIG. 12, when position adjustment of the pixels relating to the horizontal lines is performed by calculation processing in the correction circuit CC, an image with sufficient distortion correction can be formed. That is, the burden on the correction circuit CC can be reduced. In particular, in the present embodiment as described above, because aberrations including vertical distortion is suppressed due to the optical system being an eccentric optical system developed in the vertical direction, overall the occurrence of aberration can be effectively suppressed.

Example 2

Hereinafter, Example 2, which is an implementation of the optical system of the virtual image display apparatus 100 according to the second embodiment, will now be described. Data of Example 2 are also expressed in a manner similar to the data of Example 1, and redundant descriptions of the definitions and the like of the terms are omitted.

Table 4 below lists parameters for each surface constituting the virtual image display apparatus of Example 2. The unit of distance in the table is mm.

TABLE 4

| SURFACE NUMBER | SURFACE NAME | SURFACE TYPE | CURVATURE RADIUS | MATERIAL | REFRACTION/ REFLECTION |
|---|---|---|---|---|---|
| 1 | EXIT PUPIL EP | SPHERE | INFINITE | | REFRACTION |
| 2 | SECOND MIRROR 23 | XY | −3.935 | | REFLECTION |

TABLE 4-continued

| | | | | | |
|---|---|---|---|---|---|
| 3 | INCIDENCE-EMISSION PORTION 22e OF REFRACTIVE REFLECTIVE OPTICAL MEMBER 22 | XY POLYNOMIAL SURFACE POLYNOMIAL SURFACE | −12.310 | RESIN A | REFRACTION |
| 4 | the mirror portion 22r OF REFRACTIVE REFLECTIVE OPTICAL MEMBER 22 | XY POLYNOMIAL SURFACE | −15.650 | RESIN A | REFLECTION |
| 5 | INCIDENCE-EMISSION PORTION 22e OF REFRACTIVE REFLECTIVE OPTICAL MEMBER 22 | XY POLYNOMIAL SURFACE | −12.310 | | REFRACTION |
| 6 | FIRST MIRROR 21 | XY POLYNOMIAL SURFACE | −19.000 | | REFLECTION |
| 7 | REFRACTIVE PORTION 12b | XY POLYNOMIAL SURFACE | 9.130 | RESIN B | REFRACTION |
| 8 | REFRACTIVE PORTION 12a | XY POLYNOMIAL SURFACE | INFINITE | | REFRACTION |
| 9 | COVER GLASS | SPHERE | INFINITE | SILICA | REFRACTION |
| 10 | DISPLAY UNIT 11a | SPHERE | INFINITE | | REFRACTION |

| SURFACE NUMBER | GLOBAL COORDINATES | | | |
|---|---|---|---|---|
| | x | y | z | α |
| 1 | | | | |
| 2 | 0 | −7 | 41.87 | 17.6 |
| 3 | 0 | 13 | 21.6 | 21.9 |
| 4 | 0 | 16 | 17.65 | 30.3 |
| 5 | 0 | 18 | 22.36 | 15.7 |
| 6 | 0 | 24 | 32.34 | 21 |
| 7 | 0 | 26 | 21.88 | 7.38 |
| 8 | 0 | 26 | 18.91 | 7.64 |
| 9 | 0 | 27 | 18.12 | 2.52 |
| 10 | 0 | 27 | 17.02 | 1.73 |

Table 5 below is a table providing a summary of the polynomial coefficients $C_i$ that give a free curved surface included in Example 2.

TABLE 5

| | SURFACE NUMBER | | | | | | |
|---|---|---|---|---|---|---|---|
| | 2 | 3 | 4 | 5 | 6 | 7 | 8 |
| NORMALIZED RADIUS | 10 | 10 | 10 | 10 | 10 | 1 | 1 |
| C1 | −1 | 0 | 0 | 0 | 0 | 0 | 0 |
| C2 | 0 | 0 | 0 | 0 | 0 | 0 | 0 |
| C3 | −7.529E+00 | −5.390E+00 | −6.387E+01 | −5.390E+00 | 1.843E+00 | 0.000E+00 | 2.187E−01 |
| C4 | 1.587E+01 | −6.394E−01 | −1.753E+01 | −6.394E−01 | 3.989E+00 | −7.821E−02 | −1.008E−03 |
| C5 | 0.000E+00 | 0.000E+00 | 0.000E+00 | 0.000E+00 | 0.000E+00 | 0.000E+00 | 0.000E+00 |
| C6 | 8.741E+00 | −3.046E+00 | 3.532E+01 | −3.048E+00 | 2.517E+00 | −9.019E−02 | 1.877E−02 |
| C7 | 0.000E+00 | 0.000E+00 | 0.000E+00 | 0.000E+00 | 0.000E+00 | 0.000E+00 | 0.000E+00 |
| C8 | −9.621E+00 | −1.472E+00 | −8.325E+01 | −1.472E+00 | 8.266E+00 | 0.000E+00 | −3.842E−03 |
| C9 | 0.000E+00 | 0.000E+00 | 0.000E+00 | 0.000E+00 | 0.000E+00 | 0.000E+00 | 0.000E+00 |
| C10 | 2.166E+00 | −2.882E+00 | 1.385E+02 | −2.882E+00 | 1.833E+00 | 0.000E+00 | −9.130E−03 |
| C11 | −8.574E−01 | 1.649E−01 | −3.885E+01 | 1.649E−01 | 4.928E+00 | −4.620E−04 | −1.621E−04 |
| C12 | 0.000E+00 | 0.000E+00 | 0.000E+00 | 0.000E+00 | 0.000E+00 | 0.000E+00 | 0.000E+00 |
| C13 | 4.638E+00 | 5.164E−01 | −3.097E+02 | 5.164E−01 | 1.921E+00 | −1.450E−03 | −1.008E04 |
| C14 | 0.000E+00 | 0.000E+00 | 0.000E+00 | 0.000E+00 | 0.000E+00 | 0.000E+00 | 0.000E+00 |
| C15 | −4.939E−02 | −2.258E+00 | −1.626E+02 | −2.258E+00 | −2.228E−01 | 2.559E−03 | 2.058E−04 |
| C16 | 0.000E+00 | 0.000E+00 | 0.000E+00 | 0.000E+00 | 0.000E+00 | 0.000E+00 | 0.000E+00 |
| C17 | 2.171E+00 | −8.669E−01 | −6.175E+01 | −9.869E−01 | 2.241E+01 | 0.000E+00 | 2.462E−05 |
| C18 | 0.000E+00 | 0.000E+00 | 0.000E+00 | 0.000E+00 | 0.000E+00 | 0.000E+00 | 0.000E+00 |
| C19 | 4.321E−01 | −1.136E+00 | −1.040E+03 | −1.136E+00 | −2.254E+00 | 0.000E+00 | 8.874E−05 |
| C20 | 0.000E+00 | 0.000E+00 | 0.000E+00 | 0.000E+00 | 0.000E+00 | 0.000E+00 | 0.000E+00 |
| C21 | −3.497E−02 | −1.804E+00 | −6.961E+02 | −1.804E+00 | −5.449E−01 | 0.000E+00 | 1.913E−04 |
| C22 | −1.060E+00 | 0.000E+00 | −5.279E+01 | 0.000E+00 | 2.020E+00 | 3.836E−06 | 2.176E−05 |

TABLE 5-continued

| | SURFACE NUMBER | | | | | | |
|---|---|---|---|---|---|---|---|
| | 2 | 3 | 4 | 5 | 6 | 7 | 8 |
| C23 | 0.000E+00 | 0.000E+00 | 0.000E+00 | 0.000E+00 | 0.000E+00 | 0.000E+00 | 0.000E+00 |
| C24 | −1.522E+00 | 0.000E+00 | 1.762E+02 | 0.000E+00 | 3.214E+01 | 6.015E−05 | 4.504E−08 |
| C25 | 0.000E+00 | 0.000E+00 | 0.000E+00 | 0.000E+00 | 0.000E+00 | 0.000E+00 | 0.000E+00 |
| C26 | −8.398E−01 | 0.000E+00 | −1.928E+03 | 0.000E+00 | −2.809E+00 | 3.885E−05 | −2.124E−05 |
| C27 | 0.000E+00 | 0.000E+00 | 0.000E+00 | 0.000E+00 | 0.000E+00 | 0.000E+00 | 0.000E+00 |
| C28 | −5.326E−02 | 0.000E+00 | −5.302E+02 | 0.000E+00 | −3.205E−02 | −1.376E−04 | 1.370E−05 |
| C29 | 0 | 0 | 0 | 0 | 0 | 0 | 0 |
| C30 | 0 | 0 | 0 | 0 | 0 | 0 | 0 |
| C31 | 0 | 0 | 0 | 0 | 0 | 0 | 0 |
| C32 | 0 | 0 | 0 | 0 | 0 | 0 | 0 |
| C33 | 0 | 0 | 0 | 0 | 0 | 0 | 0 |
| C34 | 0 | 0 | 0 | 0 | 0 | 0 | 0 |
| C35 | 0 | 0 | 0 | 0 | 0 | 0 | 0 |
| C36 | 0 | 0 | 0 | 0 | 0 | 0 | 0 |
| C37 | 0 | 0 | 0 | 0 | 0 | 0 | 0 |
| C38 | 0 | 0 | 0 | 0 | 0 | 0 | 0 |
| C39 | 0 | 0 | 0 | 0 | 0 | 0 | 0 |
| C40 | 0 | 0 | 0 | 0 | 0 | 0 | 0 |
| C41 | 0 | 0 | 0 | 0 | 0 | 0 | 0 |
| C42 | 0 | 0 | 0 | 0 | 0 | 0 | 0 |
| C43 | 0 | 0 | 0 | 0 | 0 | 0 | 0 |
| C44 | 0 | 0 | 0 | 0 | 0 | 0 | 0 |
| C45 | 0 | 0 | 0 | 0 | 0 | 0 | 0 |

Figure 13:
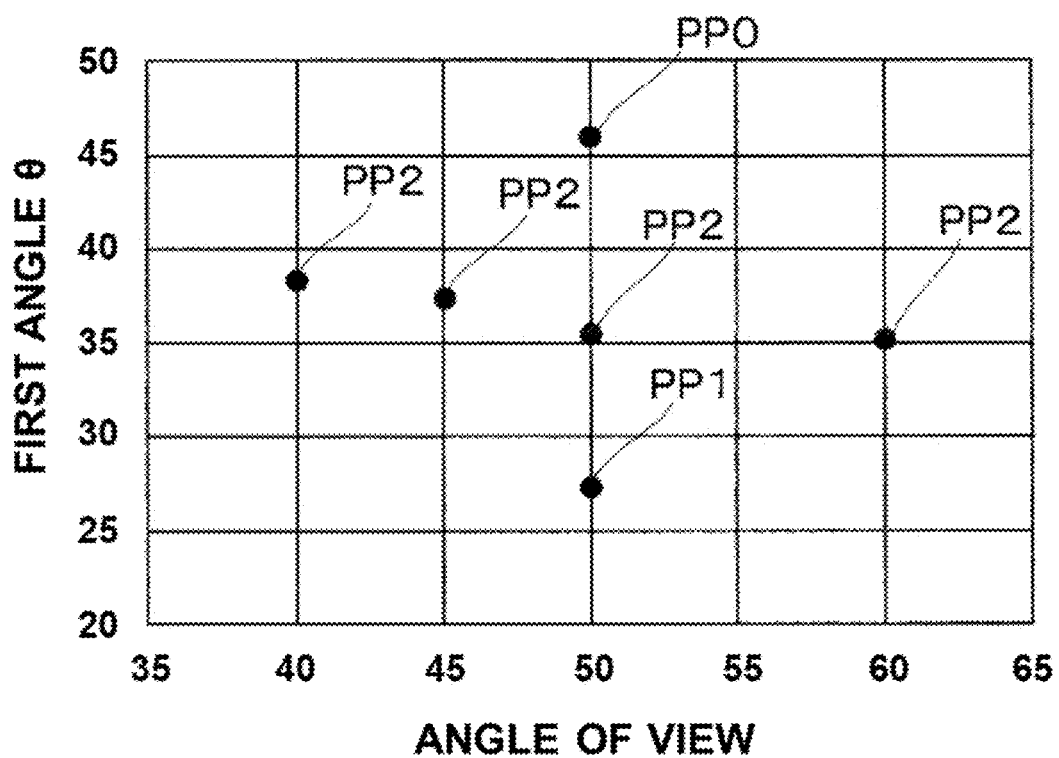
FIG. 13 is a graph showing the relationship between a first angle and angle of view.

FIG. 13 is a graph showing the relationship between the first angle θ (unit° on the vertical axis and the angle of view (unit°, diagonal angle of view) on the horizontal axis. In the diagram, a point PP0 indicates an example, as a comparative example, of a case where vertical and horizontal distortion remains present, in other words distortion correction has not been performed. In this case, the first angle θ is greater than 45° at an angle of view of 50° as seen from the position of the point PP0. In this case, though the possibility of decreasing the size of the apparatus can be considered, a large aberration would occur, requiring another method of correction via a circuit, panel shape, of the like.

In contrast, a point PP1 indicates an example of the first embodiment, in other words, a case where both vertical distortion and horizontal distortion have been corrected. In this case, the first angle θ is greater than 0° and 45° or less. More specifically, the first angle θ is approximately 27° at an angle of view of 50°. In this case, by setting the first angle θ, for example, so that the first angle θ is 30° or less (for example, approximately 27°), distortion aberration is suppressed, and, as can be seen, this allows the virtual image display apparatus 100 without or with very minimal circuit correction to be achieved.

Furthermore, a point PP2 indicates an example of the present embodiment (second embodiment), in other words, a case where the vertical distortion has been corrected. In this case also, the first angle θ is greater than 0° and 45° or less. More specifically, for example, the first angle θ is approximately 35° at an angle of view of 50° or 60°. Also, the first angle θ is approximately from 37° to 38° (less than 40°) at an angle of view of 40° or 45°. As seen from these, in the case of the present embodiment (second embodiment), when the first angle θ is kept in a range from 35° to 40°, the virtual image display apparatus 100 can reduce the burden of circuit correction and can form an image with a wide angle of view including an angle of view from 40° to 60°. That is, in the present embodiment (second embodiment), the first angle θ is in a range from 35° to 40°, and the correction of distortion aberration of the image for the direction (vertical direction of the image) corresponding to the light guiding (light guiding in the −Y direction) by the first mirror 21, the refractive reflective optical member 22, and the second mirror 23 is larger than the correction for the direction (horizontal direction of image) perpendicular to this direction. Thus, the burden of aberration correction can be reduced, and an increase in the size of the apparatus and the like can be suppressed.

Modified Examples and Others

The present disclosure is described according to the above-described embodiments, but the present disclosure is not limited to the above-described embodiments. The present disclosure may be implemented in various modes without departing from the gist of the present disclosure, and, for example, the following modifications may be carried out.

In the virtual image display apparatus 100 in the above-described embodiments, a self-luminous type display element such as an organic EL element is used as the display device 11. However, a configuration in which a laser scanner obtained by combining a laser light source and a scanner such as a polygon mirror may instead be used as the display device 11. That is, it is also possible to apply the present disclosure to a laser retinal projection type head-mounted display.

The mirror portion 22r of the refractive reflective optical member 22 is not limited to being formed of the reflection film 22c and may be a total reflection surface that satisfies total reflection conditions.

A light control device that controls light by limiting transmitted light of the second mirror 23 may be attached to the external side of the second mirror 23. The light control device adjusts a transmittance, for example, electrically. Mirror liquid crystals, electronic shades, and the like may be used as the light control device. The light control device may adjust a transmittance according to outside light brightness. When the light control device blocks the external light OL, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

The reflection film 23c of the second mirror 23 is not limited to having semi-transmissive properties and may be configured to reflect a specific polarization component such as a wire grid element. The reflection film 23c of the second mirror 23 may also be constituted by a volume hologram or the other hologram element, or may also be constituted by a diffraction grating.

In the description above, the virtual image display apparatus 100 is assumed to be mounted and used on a head, but the virtual image display apparatus 100 described above may also be used as a hand-held display that is not mounted on a head and is viewed into it like a pair of binoculars. In other words, the head-mounted display also includes a hand-held display in the present disclosure.

The virtual image display apparatus according to a specific mode includes: an imaging light emitting unit configured to emit an imaging light; a first mirror configured to reflect the imaging light from the imaging light emitting unit; an optical member including a reflecting portion configured to reflect the imaging light reflected by the first mirror; and a second mirror configured to reflect the imaging light reflected by the reflecting portion toward a position of an exit pupil, wherein a distance from the imaging light emitting unit to the first mirror is shorter than a distance from the position of the exit pupil to the second mirror; and a first angle formed by the imaging light incident on the second mirror and the imaging light reflected by the second mirror is greater than 0° and 45° or less.

In the virtual image display apparatus, the distance from the position of the exit pupil to the second mirror is provided and the first angle formed by the imaging light incident on the second mirror and the imaging light reflected by the second mirror is 45° or less. This allows the occurrence of image distortion to be sufficiently suppressed, and allows for image formation with high accuracy to be performed without requiring electrical correction and the like by a correction circuit, for example.

In a specific aspect, the optical member includes an incidence-emission portion where the imaging light from the first mirror is incident and where the imaging light reflected by the reflecting portion is emitted; and the incidence-emission portion is configured to refract the imaging light incident and the imaging light emitted. In this case, optical path adjustment is possible in relation to the refraction effects of a refractive reflective optical member.

In a specific aspect, the incidence-emission portion is an aspheric surface or a free curved surface. In this case, distortion aberration can be suppressed at the refractive reflective optical member.

In a specific aspect, a distance C from the position of the exit pupil to the second mirror is represented by a following formula:

$$C = \frac{y + z * \tan(\theta + \alpha)}{\cos(\alpha) * \tan(\theta + \alpha) - \sin(\alpha)}$$

where y is a distance in a vertical direction from the position of the exit pupil to a position of the optical member when a user normally wears the virtual image display apparatus, z is a distance in a horizontal direction from the position of the exit pupil to the position of the optical member when the user normally wears the virtual image display apparatus, α is an inclination angle of a line-of-sight of the user with respect to the horizontal direction, and θ is the first angle. In this case, a balance with the distance C can be achieved, allowing an increase in the size of the apparatus to be avoided and aberration suppressed.

In a specific aspect, the first angle is 30° or less. In this case, for example, for a rectangular image, aberration can be sufficiently suppressed in both the vertical direction and the horizontal direction.

In a specific aspect, the first angle is in a range from 35° to 40°; and in an image formed by the imaging light, distortion occurring in a direction corresponding to light guiding of the imaging light by the first mirror, the optical member, and the second mirror is larger than distortion occurring in a direction different to the direction. In this case, an increase in the size of the apparatus can be suppressed, and aberration in a direction with a greater effect can be suppressed.

In a specific aspect, the first angle is less than a second angle formed by the imaging light incident on the first mirror and the imaging light reflected by the first mirror. In this case, because the first angle is sufficiently small, an overall optical system with suppressed aberration is achieved.

In a specific aspect, the first mirror, the second mirror, and the reflecting portion are each an aspheric surface or a free curved surface. In this case, aberration can be suppressed at each reflection surface.

In a specific aspect, the second mirror is configured to reflect a portion of the imaging light toward the position of the exit pupil and transmits another portion of the imaging light. In this case, see-through viewing is possible.

What is claimed is:

1. A virtual image display apparatus comprising:
    an imaging light emitting unit that emits an imaging light;
    a first mirror that reflects the imaging light from the imaging light emitting unit;
    an optical member that includes a reflecting portion reflecting the imaging light reflected by the first mirror; and
    a second mirror that reflects the imaging light reflected by the reflecting portion toward a position of an exit pupil, wherein
    a distance from the imaging light emitting unit to the first mirror is shorter than a distance from the position of the exit pupil to the second mirror; and
    a first angle between the imaging light incident on the second mirror and the imaging light reflected by the second mirror is greater than 0° and 45° or less,
    the optical member includes an incidence-emission portion where the imaging light from the first mirror is incident and where the imaging light reflected by the reflecting portion is emitted; and
    the incidence-emission portion is configured to refract the imaging light incident and the imaging light emitted,
    the incidence-emission portion is an aspheric surface or a free curved surface.

2. The virtual image display apparatus according to claim 1, wherein
    a distance C from the position of the exit pupil to the second mirror is represented by a following formula:

$$C = \frac{y + z * \tan(\theta + \alpha)}{\cos(\alpha) * \tan(\theta + \alpha) - \sin(\alpha)}$$

where
y is a distance in a vertical direction from the position of the exit pupil to a position of the optical member when a user normally wears the virtual image display apparatus,
z is a distance in a horizontal direction from the position of the exit pupil to the position of the optical member when the user normally wears the virtual image display apparatus,
α is an inclination angle of a line-of-sight of the user with respect to the horizontal direction, and
θ is the first angle.

3. The virtual image display apparatus according to claim 1, wherein the first angle is 30° or less.

4. The virtual image display apparatus according to claim 1, wherein the first angle is in a range from 35° to 40°; and in an image according to the imaging light, distortion occurring in a direction corresponding to light guiding of the imaging light by the first mirror, the optical member, and the second mirror is larger than distortion occurring in a direction different to the direction.

5. The virtual image display apparatus according to claim 1, wherein
the first angle is smaller than a second angle formed by the imaging light incident on the first mirror and the imaging light reflected by the first mirror.

6. The virtual image display apparatus according to claim 1, wherein
the first mirror, the second mirror, and the reflecting portion are each an aspheric surface or a free curved surface.

7. The virtual image display apparatus according to claim 1, wherein
the second mirror reflects a portion of the imaging light toward the position of the exit pupil and transmits another portion of the imaging light.

* * * * *